United States Patent
Tsuda et al.

(10) Patent No.: US 9,624,353 B2
(45) Date of Patent: Apr. 18, 2017

(54) NON-IONIC SURFACTANT COMPOSITION AND FLUOROPOLYMER AQUEOUS DISPERSION

(71) Applicants: DAIKIN INDUSTRIES, LTD., Osaka-shi, Osaka (JP); DAI-ICHI KOGYO SEIYAKU CO., LTD., Kyoto-shi, Kyoto (JP); OSAKA UNIVERSITY, Suita-shi, Osaka (JP)

(72) Inventors: Nobuhiko Tsuda, Settsu (JP); Atsuko Tanaka, Settsu (JP); Kenji Adachi, Settsu (JP); Nahoko Izaki, Kyoto (JP); Masayuki Hashimoto, Kyoto (JP); Takahiro Sato, Suita (JP)

(73) Assignees: DAIKIN INDUSTRIES, LTD., Osaka (JP); DAI-ICHI KOGYO SEIYAKU CO., LTD., Kyoto (JP); OSAKA UNIVERSITY, Osaka (JP)

( * ) Notice: Subject to any disclaimer, the term of this patent is extended or adjusted under 35 U.S.C. 154(b) by 71 days.

(21) Appl. No.: 14/389,173

(22) PCT Filed: Mar. 27, 2013

(86) PCT No.: PCT/JP2013/059140
§ 371 (c)(1),
(2) Date: Sep. 29, 2014

(87) PCT Pub. No.: WO2013/146950
PCT Pub. Date: Oct. 3, 2013

(65) Prior Publication Data
US 2015/0329701 A1    Nov. 19, 2015

(30) Foreign Application Priority Data
Mar. 30, 2012   (JP) .................... 2012-082826

(51) Int. Cl.
| | | |
|---|---|---|
| *C08K 5/06* | (2006.01) | |
| *C09D 5/02* | (2006.01) | |
| *C09D 7/02* | (2006.01) | |
| *C09D 201/04* | (2006.01) | |
| *C08G 65/26* | (2006.01) | |

(52) U.S. Cl.
CPC ............ *C08K 5/06* (2013.01); *C08G 65/2609* (2013.01); *C09D 5/027* (2013.01); *C09D 7/02* (2013.01); *C09D 201/04* (2013.01)

(58) Field of Classification Search
CPC ........ C09D 5/027; C09D 7/02; C09D 201/04; C08K 5/06
See application file for complete search history.

(56) References Cited

U.S. PATENT DOCUMENTS

| 4,693,800 | A | 9/1987 | Edwards et al. |
| 6,057,284 | A | 5/2000 | Baur et al. |
| 6,124,045 | A * | 9/2000 | Soda .................... C09D 127/12 428/500 |
| 6,833,403 | B1 * | 12/2004 | Bladel ...................... C08F 6/16 523/310 |
| 7,105,597 | B2 * | 9/2006 | Soda ........................ C08K 5/06 524/502 |
| 7,361,708 | B2 * | 4/2008 | Tomihashi ............ C08F 259/08 510/356 |
| 9,353,261 | B2 * | 5/2016 | Nguyen .................. C08L 71/02 |
| 2003/0130393 | A1 * | 7/2003 | Cavanaugh ........... C08F 259/08 524/366 |
| 2005/0222313 | A1 | 10/2005 | Tomihashi et al. |
| 2010/0222491 | A1 | 9/2010 | Sawauchi et al. |
| 2011/0277786 | A1 * | 11/2011 | Zhu .......................... C11D 1/83 134/6 |

FOREIGN PATENT DOCUMENTS

| JP | 62-131037 A | 6/1987 |
| JP | 11-152385 A | 6/1999 |
| JP | 2000-511578 A | 9/2000 |
| JP | 2002-511519 A | 4/2002 |
| JP | 2002-179870 A | 6/2002 |
| JP | 2004-099774 A | 4/2004 |
| JP | 2011-213895 A | 10/2011 |
| WO | 99/52999 A1 | 10/1999 |
| WO | 03/106556 A | 12/2003 |
| WO | 2007/074902 A1 | 7/2007 |

OTHER PUBLICATIONS

Lutensol TO types, BASF, Feb. 1997.*
International Preliminary Report on Patentability dated Oct. 1, 2014 from the International Searching Authority for PCT/JP2013/059140.
International Search Report for PCT/JP2013/059140 dated Jul. 9, 2013.
Communication dated Nov. 30, 2015 from the European Patent Office in counterpart application No. 13769526.8.

* cited by examiner

*Primary Examiner* — Nicole M Buie-Hatcher
(74) *Attorney, Agent, or Firm* — Sughrue Mion, PLLC

(57) ABSTRACT

A nonionic surfactant composition including: a nonionic surfactant that contains a molecule having a $C_{10}$-$C_{22}$ alkyl group and/or alkenyl group as a hydrophobic group, a polyoxyalkylene chain as a hydrophilic group, no aromatic ring, no $C_9$-$C_{14}$ alkyl group derived from an alcohol that is produced from a higher olefin derived from a mixture of propylene and butene through an oxo process, and no $C_{13}$ alkyl group derived from an alcohol that is produced from a higher olefin derived from a propylene tetramer through an oxo process. The nonionic surfactant has a hydrodynamic radius of 5.0 to 8.0 nm at 40° C. in an aqueous solution in which a nonionic surfactant concentration is 0.1 kg/L in the nonionic surfactant composition, the radius being measured by a dynamic light scattering method.

6 Claims, 1 Drawing Sheet

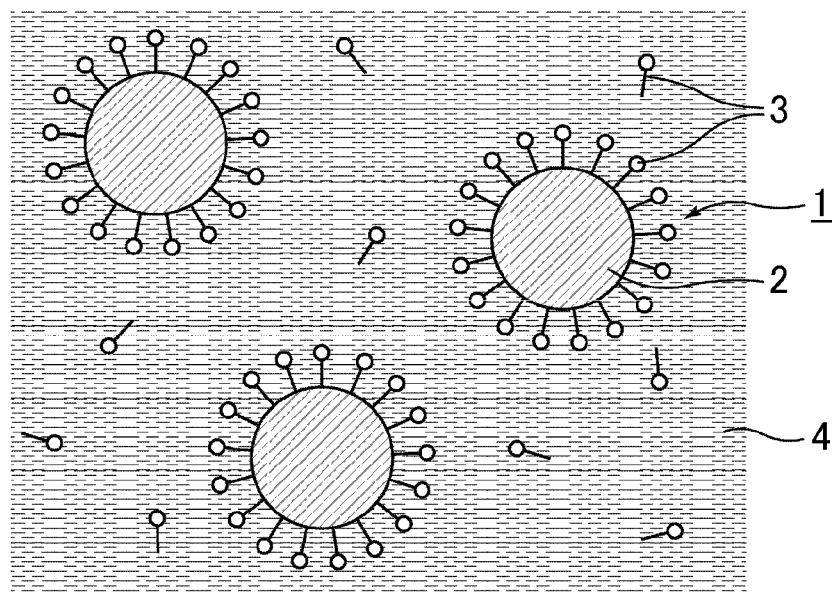

NON-IONIC SURFACTANT COMPOSITION AND FLUOROPOLYMER AQUEOUS DISPERSION

CROSS REFERENCE TO RELATED APPLICATIONS

This application is a National Stage of International Application No. PCT/JP2013/059140 filed Mar. 27, 2013, claiming priority based on Japanese Patent Application No. 2012-082826 filed Mar. 30, 2012, the contents of all of which are incorporated herein by reference in their entirety.

TECHNICAL FIELD

The present invention relates to a nonionic surfactant composition and an aqueous fluoropolymer dispersion.

BACKGROUND ART

Aqueous fluoropolymer dispersions are used for impregnation, coating, and the like. For the purpose of improving mechanical stability or storage stability, or controlling viscosity, such aqueous dispersions contain nonionic surfactants.

Various nonionic surfactants have been conventionally known.

For example, Patent Literature 1 discloses a surfactant that has a secondary alkyl group or a primary alkyl group having a side chain as a hydrophobic group, and includes a T-structure in which a hydrophilic group chain is bonded to the hydrophobic group. Further, Patent Literature 2 discloses an isotridecyl ether surfactant which is used as a foam-suppressing surfactant. The isotridecyl ether surfactant includes an at least triply branched isotridecyl and has an oxypropylene group.

Patent Literature 3 suggests a fluororesin aqueous dispersion composition containing an aliphatic polyoxy alkylene ether dispersant which has a 50% decomposition temperature of not less than 250° C.

Patent Literature 4 suggests an aqueous fluoropolymer dispersion containing a fluoropolymer, an aqueous medium, and a certain polyoxy alkylene alkyl ether stabilizer.

CITATION LIST

Patent Literature

Patent Literature 1: JP H11-152385 A
Patent Literature 2: JP 2000-511578 T
Patent Literature 3: WO 03/106556
Patent Literature 4: JP 2011-213895 A

SUMMARY OF INVENTION

Technical Problem

Nonionic surfactants impart mechanical stability and storage stability to aqueous dispersions, control the viscosities of aqueous dispersions, and improve the mixing properties of additives such as pigments and fillers. Aqueous dispersions, however, disadvantageously give off an odor when it is applied, dried, or fired for forming coating films. For example, a branched saturated primary alcohol (for example, EXXAL13 produced by ExxonMobil Chemical) having a C9-C14 distribution is produced from a higher olefin derived from a mixture of propylene and butene through an oxo process, and a surfactant is produced from the branched saturated primary alcohol. Such a surfactant acts to sufficiently stabilize a dispersion, but seriously gives off an odor. Further, a nonionic surfactant produced from a C13 saturated primary alcohol that is produced from a higher olefin derived from a propylene tetramer through an oxo process also seriously gives off an odor.

Further, surfactants having alkylphenol skeletons at hydrophobic group portions have raised environmental concerns.

Alternatively, for example, use of a nonionic surfactant produced from a naturally-occurring saturated primary alcohol, a saturated primary alcohol produced from a higher olefin derived from n-paraffin or an ethylene oligomer through an oxo process, or a higher olefin derived from a butene trimer through an oxo process reduces generation of an odor but impairs the mechanical stability of an aqueous dispersion.

Patent Literature 4 discloses good measures to solve the problems, but the measures need further improvement. Specifically, the stability of the aqueous dispersion at high temperatures is required, and polymers are required to be stably dispersed even at high concentrations.

In view of the current state of the art, the present invention aims to provide a nonionic surfactant composition capable of providing an aqueous dispersion that has excellent mechanical stability and storage stability, is less viscous at high temperatures and high concentrations, and is less likely to give off an odor during drying and firing.

Solution to Problem

It is known that addition of a nonionic surfactant to an aqueous medium allows polymer particles to be stably dispersed in the aqueous medium. The reason why the nonionic surfactant allows polymer particles to be stably dispersed in an aqueous medium is that nonionic surfactants 3 are adsorbed on and around a polymer particle 2 to form a colloid 1 in an aqueous phase 4 (protective colloid effect), as shown in FIG. 1. Based on the reason, how the nonionic surfactant is dispersed in water is not directly related to the dispersion stability of the polymer particles.

Contrary to common knowledge in the art, the present inventors have noted the hydrodynamic radius of a nonionic surfactant in water, and have found that the hydrodynamic radius of a nonionic surfactant in water is surprisingly closely related to the stability of polymer particles in an aqueous medium. Thereby, the present invention has been completed.

That is, the present invention relates to a nonionic surfactant composition including: a nonionic surfactant that includes a molecule having a C10-C22 alkyl group and/or alkenyl group as a hydrophobic group, a polyoxyalkylene chain as a hydrophilic group, no aromatic ring, no C9-C14 alkyl group derived from an alcohol that is produced from a higher olefin derived from a mixture of propylene and butene through an oxo process, and no C13 alkyl group derived from an alcohol that is produced from a higher olefin derived from a propylene tetramer through an oxo process, wherein the nonionic surfactant has a hydrodynamic radius of 5.0 to 8.0 nm at 40° C. in an aqueous solution in which a nonionic surfactant concentration is 0.1 kg/L in the nonionic surfactant composition, the radius being measured by a dynamic light scattering method.

The nonionic surfactant preferably comprises a nonionic surfactant represented by the formula (1):

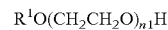

wherein $R^1$ is a C13 linear or branched alkyl group (except a C13 alkyl group derived from an alcohol that is produced from a higher olefin derived from a mixture of propylene and butene through an oxo process, and a C13 alkyl group derived from an alcohol that is produced from a higher olefin derived from a propylene tetramer through an oxo process), and $n^1$ is an integer of 5 to 15, and a nonionic surfactant represented by the formula (2):

$$R^2O(CH_2CH(CH_3)O)_m(CH_2CH_2O)_{n2}H$$

wherein $R^2$ is a C10-C16 linear or branched alkyl group (except a C10-C14 alkyl group derived from an alcohol that is produced from a higher olefin derived from a mixture of propylene and butene through an oxo process, and a C13 alkyl group derived from an alcohol that is produced from a higher olefin derived from a propylene tetramer through an oxo process), $n^2$ is an integer of 5 to 20, and m is an integer of 1 to 6.

A molar ratio (1)/(2) of the nonionic surfactant represented by the formula (1) to the nonionic surfactant represented by the formula (2) is preferably (99 to 60)/(1 to 40)

The nonionic surfactant preferably comprises a nonionic surfactant represented by the formula (1):

$$R^1O(CH_2CH_2O)_{n1}H$$

wherein $R^1$ is a C13 linear or branched alkyl group (except a C13 alkyl group derived from an alcohol that is produced from a higher olefin derived from a mixture of propylene and butene through an oxo process, and a C13 alkyl group derived from an alcohol that is produced from a higher olefin derived from a propylene tetramer through an oxo process), and $n^1$ is an integer of 5 to 15, and a nonionic surfactant represented by the formula (3):

$$R^3O(CH_2CH_2O)_{n3}H$$

wherein $R^3$ is a C12-C14 saturated secondary alkyl group (except a C12-C14 alkyl group derived from an alcohol that is produced from a higher olefin derived from a mixture of propylene and butene through an oxo process, and a C13 alkyl group derived from an alcohol that is produced from a higher olefin derived from a propylene tetramer through an oxo process), and $n^3$ is an integer of 5 to 15.

A molar ratio (1)/(3) of the nonionic surfactant represented by the formula (1) to the nonionic surfactant represented by the formula (3) is preferably (99 to 50)/(1 to 50).

The nonionic surfactant is preferably a nonionic surfactant represented by the formula (1):

$$R^1O(CH_2CH_2O)_{n1}H$$

wherein $R^1$ is a C13 linear or branched alkyl group (except a C13 alkyl group derived from an alcohol that is produced from a higher olefin derived from a mixture of propylene and butene through an oxo process, and a C13 alkyl group derived from an alcohol that is produced from a higher olefin derived from a propylene tetramer through an oxo process), and $n^1$ is an integer of 5 to 15, a nonionic surfactant represented by the formula (4):

$$R^4O(CH_2CH_2O)_{n4}H$$

wherein $R^4$ is a C10 branched alkyl group (except a C10 alkyl group derived from an alcohol that is produced from a higher olefin derived from a mixture of propylene and butene through an oxo process), and $n^4$ is an integer of 3 to 15, and a nonionic surfactant represented by the formula (5):

$$R^5O(CH_2CH_2O)_{n5}H$$

wherein $R^5$ is a C18 branched alkyl group, and $n^5$ is an integer of 5 to 20.

A molar ratio (1)/(4)/(5) of the nonionic surfactant represented by the formula (1), the nonionic surfactant represented by the formula (4), and the nonionic surfactant represented by the formula (5) is preferably (93 to 50)/(45 to 5)/(13 to 2).

The present invention also relates to an aqueous fluoropolymer dispersion including the nonionic surfactant composition (A), a fluoropolymer (B), and an aqueous medium (C).

Advantageous Effects of Invention

Use of the nonionic surfactant composition of the present invention can provide an aqueous fluoropolymer dispersion that has excellent mechanical stability and storage stability, is less viscous at high temperatures and high concentrations, and is less likely to give off an odor during drying and firing.

BRIEF DESCRIPTION OF DRAWINGS

FIG. 1 shows polymer particles dispersed in water, previously considered.

DESCRIPTION OF EMBODIMENTS

The present invention is explained in detail below.

The nonionic surfactant composition of the present invention is a nonionic surfactant composition including a nonionic surfactant. The nonionic surfactant has a hydrodynamic radius of 5.0 to 8.0 nm in an aqueous solution at 40° C. of the nonionic surfactant composition having a nonionic surfactant concentration of 0.1 kg/L. The radius is measured by a dynamic light scattering method.

The nonionic surfactant composition of the present invention contains the nonionic surfactant having the hydrodynamic radius in the above range. Thus, addition of the nonionic surfactant composition of the present invention enables to provide an aqueous fluoropolymer dispersion that has excellent mechanical stability and storage stability, is less viscous at high temperatures and high concentrations, and does not give off an odor during drying and firing.

The mechanical stability herein is a property of being less likely to generate agglomerates that are non-redispersible when vibration or shear force is applied using pumps, agitation blades, or the like during delivery or redispersion of the dispersion.

In the nonionic surfactant composition of the present invention, the nonionic surfactant has a hydrodynamic radius measured by a dynamic light scattering method at 40° C. of 5.0 to 8.0 nm, and preferably 5.0 to 7.0 nm.

The hydrodynamic radius may be calculated in the following way. The nonionic surfactant composition is diluted with water to prepare a 0.1 kg/L aqueous solution of the nonionic surfactant. The aqueous solution is heated to 40° C., and the scattered-light intensity of the aqueous solution at 40° C. is determined using a dynamic light scattering device (ALV/SLS/DLS-5000, produced by ALV). A hydrodynamic radius is calculated from the resulting scattered-light intensity.

The nonionic surfactant composition of the present invention includes one or two or more types of nonionic surfactants. The nonionic surfactants have a hydrophobic group and a hydrophilic group. The hydrophobic group is preferably a C10-C22 alkyl group or alkenyl group. The hydrophilic group is preferably a polyoxyalkylene chain.

The hydrophobic group is a hydrocarbon group derived from an alcohol, preferably a C10-C22 alkyl group and/or alkenyl group, and more preferably a C10-C20 alkyl group.

One type of alcohol or two or more types of alcohols may be used, and the number of carbon atoms of the two or more types of alcohols may be different from one another. Further, the alcohol(s) may be synthetically produced or naturally occurring. Further, the chemical structure of the alcohol(s) may be a single composition or a mixture of isomers.

Examples of the naturally-occurring higher alcohols to be preferably used include decyl alcohol, lauryl alcohol (1-dodecanol), myristyl alcohol (1-tetradecanol), cetyl alcohol (1-hexadecanol), stearyl alcohol (1-octadecanol), oleyl alcohol (cis-9-octadecen-1-ol), and behenyl alcohol (1-docosanol).

In addition, examples of the synthetically produced higher alcohols include higher olefins derived from n-paraffin or ethylene oligomers, and saturated primary alcohols and saturated secondary alcohols which are produced from higher olefins derived from a butene trimer through an oxo process. Isodecanol, isoundecanol, isododecanol, isotridecanol, NEODOL 23, NEODOL 25, NEODOL 45 (produced by Shell Chemicals), SAFOL23 (produced by Sasol), or C12-C14 saturated secondary alcohols may preferably be used. Further, guerbet alcohols having a chemical structure of a C10-C22 2-alkyl-1-alkanol may preferably be used alone, or their mixtures may preferably be used as the higher alcohol.

The hydrophobic group is preferably a residue of the aforementioned alcohol from which the hydroxyl group is removed.

The polyoxyalkylene chain preferably includes a C1-C4 oxyalkylene group. A C2 alkylene oxide is ethylene oxide (hereinafter also referred to as "EO"). A C3 alkylene oxide is propylene oxide (hereinafter also referred to as "PO"). A C4 alkylene oxide is tetrahydrofuran or butylene oxide. Further, the polyoxyalkylene chain of the present invention may be a single polymer chain composed of an alkylene oxide, a random polymer chain or block polymer chain of two or more alkylene oxides, or a combination thereof. Further, the number of moles (average number of moles) of added alkylene oxides is preferably in the range of 1 to 50. Further, alkylene oxides are added to the higher alcohol by a publicly known method. In usual commercial production, addition reaction of alkylene oxides is generally performed using a reaction catalyst. In this case, residues derived from the reaction catalyst may be left in the finished products, or further, the reaction catalyst may be eliminated by a publicly known purification operation.

The nonionic surfactant preferably has an average molecular weight of 300 to 2500, and the nonionic surfactant composition of the present invention preferably has an average molecular weight (weight-average molecular weight of each component) of 500 to 900.

A 1% aqueous solution of the nonionic surfactant has a cloud point of preferably 40° C. to 80° C., and more preferably 50° C. to 70° C.

Use of a nonionic surfactant having a cloud point in the above ranges is advantageous because a fluorine-containing anionic surfactant is stably eliminated from an aqueous dispersion containing fluoropolymer particles including the nonionic surfactant composition of the present invention, or an aqueous dispersion can be condensed, particularly by a phase separation condensation method, in a short time with less generation of aggregates.

The cloud point is a value determined by a method according to BS EN 1890:1999.

The nonionic surfactant includes a molecule having no aromatic ring. Particularly in recent years, since the nonionic surfactant is free of alkylphenol structure that may cause problems related to its poor biodegradablity and harm to the aquatic environment, the nonionic surfactant composition of the present invention has less environmental impact. Further, the molecule of the nonionic surfactant does not contain both a C9-C14 alkyl group derived from an alcohol that is produced from a higher olefin derived from a mixture of propylene and butene through an oxo process and a C13 alkyl group derived from an alcohol that is produced from a higher olefin derived from a propylene tetramer through an oxo process. These alkyl groups are considered to cause an odor problem in handling due to their structures. Accordingly, use of the nonionic surfactant composition of the present invention allows to suppress generation of an odor in a drying step or firing step.

The nonionic surfactant composition of the present invention preferably includes two or more nonionic surfactants in order to easily control the hydrodynamic radius of the nonionic surfactant in the nonionic surfactant composition. At least one surfactant (hereinafter also referred to as "main compound") of the two or more nonionic surfactants is preferably a linear and/or branched alkyl group having a C10-C15 hydrophobic group, and more preferably an alkyl group having a C13 hydrophobic group. The alkyl group is preferably branched.

Further, the polyoxyalkylene chain of a nonionic surfactant included in the nonionic surfactant of the present invention as a main compound preferably has an average number of moles of added alkylene oxides of 1 to 50, an average number of moles of added ethylene oxides of 5 to 15, and an average number of moles of added propylene oxides of 1 to 6 when an oxypropylene group is included, and is more preferably a single polymer chain of an oxyethylene group having an average number of added moles of 5 to 15.

Further, the hydrophobic group of a nonionic surfactant used in combination with the nonionic surfactant as a main compound in the nonionic surfactant of the present invention preferably has 10 to 22 carbon atoms. The hydrophobic group may be linear or branched. Further, the polyoxyalkylene chain preferably has an average number of moles of added alkylene oxides of 1 to 50, an average number of moles of added ethylene oxides of 3 to 20, and an average number of added moles of 1 to 6 when an oxypropylene chain is included.

The nonionic surfactant composition of the present invention is usually prepared by mixing two or more nonionic surfactants, which are separately synthesized. The desired nonionic surfactant composition may also be prepared in the following ways: two or more higher alcohols different in the number of carbon atoms and/or structure are preliminarily mixed, and alkylene oxides are added to the alcohols; or alkylene oxide adducts of two or more higher alcohols different in the number of carbon atoms and/or structure of a hydrophobic group are mixed as intermediates, and alkylene oxides are added to the adducts.

The nonionic surfactant composition of the present invention preferably includes a nonionic surfactant represented by the formula (1):

$$R^1O(CH_2CH_2O)_{n_1}H$$

wherein $R^1$ is a C13 linear or branched alkyl group (except a C13 alkyl group derived from an alcohol that is produced from a higher olefin derived from a mixture of propylene and butene through an oxo process, and a C13 alkyl group derived from an alcohol that is produced from a higher olefin derived from a propylene tetramer through an oxo process), and $n^1$ is an integer of 5 to 15, and a nonionic surfactant represented by the formula (2):

$$R^2O(CH_2CH(CH_3)O)_m(CH_2CH_2O)_{n2}H$$

wherein $R^2$ is a C10-C16 linear or branched alkyl group (except a C10-C14 alkyl group derived from an alcohol that is produced from a higher olefin derived from a mixture of propylene and butene through an oxo process, and a C13 alkyl group derived from an alcohol that is produced from a higher olefin derived from a propylene tetramer through an oxo process), $n^2$ is an integer of 5 to 20, and m is an integer of 1 to 6.

In the formula (1), the hydrophobic group $R^1$ may be a linear and/or branched alkyl group derived from an alcohol that is produced from a higher olefin derived from an ethylene oligomer or a higher olefin derived from a butene trimer through an oxo process. $R^1$ is preferably a branched alkyl group, more preferably a C13 branched alkyl group derived from an alcohol that is produced from a higher olefin derived from a butene trimer through an oxo process. Further, the polyoxyalkylene chain is preferably a single polymer chain composed of an oxyethylene group, and has an average number of added moles $n^1$ of preferably 5 to 15.

In the formula (2), the hydrophobic group $R^2$ may be a C10-C16 linear and/or branched alkyl group, and the polyoxyalkylene chain is preferably composed of a polyoxyethylene chain and a polyoxypropylene chain. As an embodiment of such a chain, a block copolymer is more preferred which is prepared by addition polymerization of propylene oxides with a material higher alcohol, and following addition polymerization of ethylene oxides therewith. The average number of moles m of added propylene oxides is preferably in the range of 1 to 6, and the average number of moles $n^2$ of added ethylene oxides is preferably in the range of 5 to 20.

A molar ratio (1)/(2) of the nonionic surfactant represented by the formula (1) to the nonionic surfactant represented by the formula (2) is preferably (99 to 60)/(1 to 40), and more preferably (95 to 75)/(5 to 25). Addition of the nonionic surfactants having the molar ratios in the above range to the aqueous dispersion can provide an aqueous dispersion that has excellent mechanical stability and storage stability, and is less viscous at high temperatures and high concentrations.

The nonionic surfactant composition of the present invention preferably includes a nonionic surfactant represented by the formula (1):

$$R^1O(CH_2CH_2O)_{n1}H$$

wherein $R^1$ is a C13 linear or branched alkyl group (except a C13 alkyl group derived from an alcohol that is produced from a higher olefin derived from a mixture of propylene and butene through an oxo process, and a C13 alkyl group derived from an alcohol that is produced from a higher olefin derived from a propylene tetramer through an oxo process), and $n^1$ is an integer of 5 to 15, and a nonionic surfactant represented by the formula (3):

$$R^3O(CH_2CH_2O)_{n3}H$$

wherein $R^3$ is a C12-C14 saturated secondary alkyl group (except a C12-C14 alkyl group derived from an alcohol that is produced from a higher olefin derived from a mixture of propylene and butene through an oxo process, and a C13 alkyl group derived from an alcohol that is produced from a higher olefin derived from a propylene tetramer through an oxo process), and $n^3$ is an integer of 5 to 15.

A molar ratio (1)/(3) of the nonionic surfactant represented by the formula (1) to the nonionic surfactant represented by the formula (3) is preferably (99 to 50)/(1 to 50), and more preferably (95 to 75)/(5 to 25). Addition of the nonionic surfactants having the molar ratios in the above range to the aqueous dispersion can provide an aqueous dispersion that has excellent mechanical stability and storage stability, and is less viscous at high temperatures and high concentrations.

The nonionic surfactant composition of the present invention preferably includes a nonionic surfactant represented by the formula (1):

$$R^1O(CH_2CH_2O)_{n1}H$$

wherein $R^1$ is a C13 linear or branched alkyl group (except a C13 alkyl group derived from an alcohol that is produced from a higher olefin derived from a mixture of propylene and butene through an oxo process, and a C13 alkyl group derived from an alcohol that is produced from a higher olefin derived from a propylene tetramer through an oxo process), and $n^1$ is an integer of 5 to 15), a nonionic surfactant represented by the formula (4):

$$R^4O(CH_2CH_2O)_{n4}H$$

wherein $R^4$ is a C10 branched alkyl group (except a C10 alkyl group derived from an alcohol that is produced from a higher olefin derived from a mixture of propylene and butene through an oxo process), and $n^4$ is an integer of 3 to 15, and a nonionic surfactant represented by the formula (5):

$$R^5O(CH_2CH_2O)_{n5}H$$

wherein $R^5$ is a C18 branched alkyl group, and $n^5$ is an integer of 5 to 20.

In the formula (4), the hydrophobic group $R^4$ may be a C10 branched alkyl group derived from an alcohol that is produced from a higher olefin derived from a propylene trimer through an oxo process. Further, a branched alkyl group derived from a C10 guerbet alcohol having a 2-alkyl-1-alkanol chemical structure may preferably be used. Further, a polyoxyalkylene chain is a single polymer chain composed of an oxyethylene group, and the average number of added moles $n^4$ is preferably 3 to 15.

In the formula (5), the hydrophobic group $R^5$ may be a C18 branched alkyl group, and is preferably a branched alkyl group derived from a C18 guerbet alcohol having a 2-alkyl-1-alkanol chemical structure. In this case, alkyl groups having different distributions of carbon numbers or branching degrees can be designed depending on the materials. However, in the present invention, an alkyl group having a higher branching degree is preferably selected. Further, the polyoxyalkylene chain is a single polymer chain composed of an oxyethylene group, and the average number of added moles $n^5$ is preferably 5 to 20.

A molar ratio (1)/(4)/(5) of the nonionic surfactant represented by the formula (1), the nonionic surfactant represented by the formula (4), and the nonionic surfactant represented by the formula (5) is preferably (93 to 50)/(45 to 5)/(13 to 2), and more preferably (83 to 55)/(40 to 10)/(7 to 3). Addition of the nonionic surfactants at the molar ratios in the above range to the aqueous dispersion can provide an aqueous dispersion that has excellent mechanical stability and storage stability, and is less viscous at high temperatures and high concentrations.

The nonionic surfactant composition of the present invention preferably contains substantially nothing other than the nonionic surfactants, and is more preferably substantially composed only of the nonionic surfactants and still more preferably composed only of the nonionic surfactants. The nonionic surfactant composition of the present invention contains the nonionic surfactants in a total amount of preferably not less than 97% by mass, more preferably not less than 99% by mass, and still more preferably 100% by mass.

The nonionic surfactant composition of the present invention can be produced, for example, by mixing two or more nonionic surfactants in an appropriate molar ratio.

Use of the nonionic surfactant composition of the present invention in the aqueous dispersion containing a fluoropolymer can provide an aqueous dispersion that has excellent mechanical stability and storage stability, is less viscous at high temperatures and high concentrations, and is less likely to give off an odor during drying and firing.

The present invention also relates to an aqueous fluoropolymer dispersion including the nonionic surfactant composition (A), a fluoropolymer (B), and an aqueous medium (C).

The aqueous fluoropolymer dispersion of the present invention is explained in detail below.

The aqueous fluoropolymer dispersion of the present invention contains the nonionic surfactant composition (A), the fluoropolymer (B), and the aqueous medium (C).

The nonionic surfactant composition (A) is the above-described nonionic surfactant composition of the present invention.

The amount of the nonionic surfactant composition (A) is preferably 2 to 10 parts by mass based on 100 parts by mass of the fluoropolymer (B) described below. If the amount is less than 2 parts by mass, mechanical stability and static stability may not be sufficiently provided, so that the purpose of the present invention may not be achieved. If the amount is more than 10 parts by mass, the fluoropolymer dispersion becomes highly viscous to possibly impair the storage stability.

The above amount is more preferably not less than 4 parts by mass, and more preferably not more than 6 parts by mass based on 100 parts by mass of the fluoropolymer (B).

The fluoropolymer (B) is preferably at least one polymer selected from the group consisting of polytetrafluoroethylene, tetrafluoroethylene/hexafluoropropylene copolymers, tetrafluoroethylene/perfluoro(alkyl vinyl ether) copolymers, polychlorotrifluoroethylene, polyvinylidene fluoride, ethylene/tetrafluoroethylene copolymers, and ethylene/chloro tetrafluoroethylene copolymers. Polytetrafluoroethylene is more preferred.

The fluoropolymer (B) is preferably in the form of particles having an average particle size of 0.05 to 0.50 µm. If the average particle size is less than 0.05 µm, the mechanical stability and storage stability of the aqueous dispersion may become poor, and the system becomes highly viscous to possibly deteriorate the handleability. If the average particle size is more than 0.50 µm, the stability of the aqueous dispersion may be extremely impaired. Further, a coating film made from the aqueous dispersion may have an outward appearance with poor smoothness, or may have poor adhesion.

The upper limit of the average particle size is more preferably 0.35 µm, and the lower limit thereof is more preferably 0.10 µm. If the average particle size is not less than 0.25 µm, a coating material prepared from the aqueous dispersion can be applied with easy control of the thickness. In particular, a coating material suitable for thick coating can be prepared.

The average particle size is determined as follows. A standard curve of the transmittance of 550 nm incident light through a unit length of an aqueous fluoropolymer dispersion adjusted to have a resin solids concentration of 0.22% by mass versus an average particle size determined by measuring the particle diameter in a certain direction on a transmission electron micrograph is constructed. The average particle size is determined from the transmittance based on the standard curve.

The fluoropolymer (B) may be produced by any method, and is preferably obtained by emulsion polymerization of a fluoromonomer for composing the fluoropolymer (B) and a monomer in the presence of the below-described fluorine-containing anionic surfactant (D), in view of high productivity and stable production.

The solids concentration of the fluoropolymer (B) of the aqueous fluoropolymer dispersion of the present invention is preferably 30 to 75% by mass, more preferably 40 to 65% by mass, and still more preferably 50 to 65% by mass.

The aqueous medium (C) may be water or a mixed aqueous solvent containing water in combination with a water-soluble compound such as alcohol.

The aqueous fluoropolymer dispersion of the present invention is preferably produced by the production method including the steps of:
(i) putting the fluoromonomer, the aqueous medium (C), and the fluorine-containing anionic surfactant (D) into a reaction container,
(ii) putting a polymerization initiator in the reaction container to initiate polymerization,
(iii) additionally putting the fluoromonomer to the reaction container to continue the polymerization,
(iv) releasing the pressure in the reaction container to terminate the polymerization,
(v) collecting an aqueous dispersion containing the fluoropolymer (B), the aqueous medium (C), and the fluorine-containing anionic surfactant (D), and
(vi) adding the nonionic surfactant composition (A) to the aqueous dispersion.

After the aqueous dispersion is collected, that is, after the step (v), the fluorine-containing anionic surfactant (D) may be removed or the collected aqueous dispersion may be condensed. The fluorine-containing anionic surfactant (D) is preferably removed, recovered, and recycled in view of particularly economic and environmental aspects. The removal of the surfactant and the condensation of the dispersion may be performed by a publicly known method such as an ion-exchange resin method, phase separation condensation, ultrafiltration, or electric condensation.

The aqueous fluoropolymer dispersion which has been condensed or from which the surfactant has been removed contains the fluorine-containing anionic surfactant (D) of preferably less than 500 ppm, more preferably not more than 200 ppm, and particularly preferably not more than 100 ppm, based on the solids content of the fluoropolymer (B) on a mass basis. The lower limit of the amount of the surfactant (D) is not particularly limited, and may be not less than 0.1 ppm.

The above monomer may preferably be at least one monomer selected from the group consisting of tetrafluoroethylene, hexafluoropropylene, perfluoro(alkyl vinyl ether), chlorotrifluoroethylene, vinylidene fluoride, and ethylene. Monomers other than these monomers may be selected in accordance with a composition of the target fluoropolymer (B).

The aqueous fluoropolymer dispersion of the present invention may further contain a polyhydric alcohol. Containing of the polyhydric alcohol improves film forming properties.

Examples of the polyhydric alcohol include ethylene glycol, 1,2-propanediol, 1,3-propanediol, 1,2-butanediol, 1,3-butanediol, 1,4-butanediol, 1,5-pentanediol, 2-butene-1, 4-diol, glycerin, 2-ethyl-2-hydroxy methyl-1,3-propanediol, 1,2,6-hexanetriol, and triethylene glycol.

The fluorine-containing anionic surfactant (D) is a compound having a fluorine atom and showing surface activity. Examples of the fluorine-containing anionic surfactant (D) include perfluorocarboxylic acids and their salts, perfluorosulfonic acids and their salts, and fluoroether compounds. Examples of the fluorocarboxylic acids include perfluoroalkyl carboxylic acids such as perfluorooctanoic acid.

The fluorine-containing anionic surfactant (D) is preferably a fluorine-containing anionic surfactant represented by the formula (2):

$$Rf^1-Y^1 \qquad (2)$$

(in the formula, $Rf^1$ represents a C2-C12 linear or branched fluoroalkyl group to which a divalent oxygen atom may be inserted, $Y^1$ represents $-COOM^1$, $-SO_3M^2$, $-SO_2NM^3M^4$, or $-PO_3M^5M^6$, and the above $M^1$, $M^2$, $M^3$, $M^4$, $M^5$, and $M^6$ are the same as or different from one another, and each represent H or a univalent cation).

Examples of the univalent cation include —Na, —K, and —NH$_4$. $Rf^1$ is more preferably a C2-C6 linear or branched fluoroalkyl group to which a divalent oxygen atom may be inserted.

$Y^1$ is preferably —COOH, —COONa, —COOK, or —COONH$_4$, and more preferably —COONH$_4$.

The fluorine-containing anionic surfactant (D) is more preferably a fluorine-containing anionic surfactant represented by the formula (3):

$$CF_3-(CF_2)_{n1}-Y^1 \qquad (3)$$

(in the formula, $n^1$ represents an integer of 1 to 5, and $Y^1$ is as defined above) or a fluorine-containing anionic surfactant represented by the formula (4):

$$Rf^2O-Rf^3O-Rf^4-Y^1 \qquad (4)$$

(in the formula, $Rf^2$ represents a C1-C3 fluoroalkyl group, and $Rf^3$ and $Rf^4$ are each independently a C1-C3 linear or branched fluoroalkylene group, the total number of carbons of $Rf^2$, $Rf^3$, and $Rf^4$ being not more than 6; and $Y^1$ is as defined above).

Examples of the fluorine-containing anionic surfactant represented by the formula (3) include $CF_3(CF_2)_4COONH_4$, $CF_3(CF_2)_3COONH_4$, $CF_3(CF_2)_2COONH_4$, $CF_3(CF_2)_3SO_3Na$, and $CF_3(CF_2)_3SO_2NH_2$.

Examples of the fluorine-containing anionic surfactant represented by the formula (4) include a fluorine-containing anionic surfactant represented by the formula:

$$CF_3O-CF(CF_3)CF_2O-CX^1(CF_3)-Y^1$$

(in the formula, $X^1$ represents H or F, and $Y^1$ is as defined above), a fluorine-containing anionic surfactant represented by the formula:

$$CF_3O-CF_2CF_2CF_2O-CFX^1CF_2-Y^1$$

(in the formula, $X^1$ represents H or F, and $Y^1$ is as defined above), and a fluorine-containing anionic surfactant represented by the formula:

$$CF_3CF_2O-CF_2CF_2O-CFX^1-Y^1$$

(in the formula, $X^1$ represents H or F, and $Y^1$ is as defined above).

These fluorine-containing anionic surfactants (D) may be used alone or two or more of these may be used in combination.

The aqueous fluoropolymer dispersion of the present invention preferably contains an anionic surfactant for the purpose of controlling the viscosity of the aqueous dispersion or improving the miscibility of pigments, fillers, or the like. The anionic surfactant may be appropriately added as long as it does not adversely affect economic and environmental aspects.

The aqueous fluoropolymer dispersion of the present invention may contain at least one surfactant selected from the group consisting of the above fluorine-containing anionic surfactant (D) and a non-fluorine-containing anionic surfactant (E). These surfactants may be added to the aqueous dispersion together with the nonionic surfactant composition (A) in the step (vi).

The total amount of the fluorine-containing anionic surfactant (D) and the non-fluorine-containing anionic surfactant (E) is preferably 0 to 0.5% by mass and more preferably 0.01 to 0.1% by mass based on the solids content of the fluoropolymer (B) on amass basis. If the total amount exceeds the above amount, the viscosity is not controlled, and the mechanical stability and the storage stability of the aqueous dispersion may be impaired.

The non-fluorine-containing anionic surfactant (E) is preferably at least one surfactant selected from the group consisting of sulfosuccinic acid alkyl esters, sulfosuccinic acid alkyl ester salts, sulfosuccinic acid fluoroalkyl esters, sulfosuccinic acid fluoroalkyl ester salts, and acid group-containing non-fluorine-containing anionic surfactants having a pKa of less than 4.

Examples of the sulfosuccinic acid alkyl esters and the sulfosuccinic acid alkyl ester salts include compounds represented by the formula (5):

$$R^{11}-OCOCH(SO_3Z^1)CH_2COO-R^{12} \qquad (5)$$

(in the formula, $R^{11}$ and $R^{12}$ are the same as or different from each other and each represent a C4-C12 alkyl group, $Z^1$ represents an alkali metal, alkaline-earth metal, or NH$_4$).

Examples of the sulfosuccinic acid fluoroalkyl esters and sulfosuccinic acid fluoroalkyl ester salts include compounds represented by the formula (6):

$$Rf^{11}-R^{13}OCOCH(SO_3Z^1)CH_2COO-R^{14}-Rf^{12} \qquad (6)$$

(in the formula, $Rf^{11}$ and $Rf^{12}$ are the same as or different from each other and each represent a C1-C6 perfluoroalkyl group which may contain a hydrogen atom at the terminal, and $R^{13}$ and $R^{14}$ are the same as or different from each other and each represent a C1-C5 alkylene group, $Z^1$ represents an alkali metal, an alkaline-earth metal, or NH$_4$).

Examples of $R^{11}$ and $R^{12}$ in the formula (5) include linear or branched alkyl groups such as n-butyl, iso-butyl, sec-butyl, n-pentyl, iso-pentyl, neopentyl, tert-pentyl, n-hexyl, iso-hexyl, tert-hexyl, n-heptyl, iso-heptyl, tert-heptyl, n-octyl, iso-octyl, tert-octyl, n-nonyl, iso-nonyl, tert-nonyl, n-decynyl, and 2-ethylhexyl. $R^{11}$ and $R^{12}$ are each preferably a C8-C12 alkyl group.

$Rf^{11}$ and $Rf^{12}$ in the formula (6) each preferably has 3 to 5 carbon atoms, and $R^{13}$ and $R^{14}$ each preferably has 1 to 2 carbon atoms.

Preferred examples of $Z^1$ in the formulas (5) and (6) include Na and NH$_4$.

The non-fluorine-containing anionic surfactant (E) is preferably sulfosuccinic acid alkyl esters represented by the formula (5) or their salts. Further, $R^{11}$ and $R^{12}$ in the formula (5) are preferably the same as or different from each other, and are each preferably a C8-C12 alkyl group. Examples of the sulfosuccinic acid alkyl esters include di-n-octyl sulfosuccinic acid ester and di-2-ethylhexyl sulfosuccinic acid ester.

The non-fluorine-containing anionic surfactant (E) may be an acid group-containing non-fluorine-containing anionic surfactant having a pKa of less than 4. The acid group is preferably at least one acid group selected from the group consisting of a carboxyl group, a sulfonyl group, a phosphoric acid and their salts, and particularly more preferably at least one acid group selected from the group consisting of a carboxyl group, a sulfonyl group, and their salts. The non-fluorine-containing anionic surfactant (E) may contain, in addition to the acid group, other groups such as a polyoxy alkylene group containing a C2-C4 oxyalkylene group or an amino group. The amino group is not protonated.

The pKa is preferably not more than 3. If the anionic surfactant is of a kind that dissociates in stages, the smallest value of the pKas is in the above range.

The acid group-containing non-fluorine-containing anionic surfactant having a pKa of less than 4 is preferably a compound having a hydrocarbon as a main chain, and, is for example, a compound having a saturated or unsaturated C6-C40, preferably C8-C20, or more preferably C9-C13 aliphatic chain. The saturated or unsaturated aliphatic chain may be a linear or branched chain, and may have a cyclic structure. The hydrocarbon may be aromatic or may have an aromatic group. The hydrocarbon may have a heteroatom such as oxygen, nitrogen, and sulfur.

Examples of the acid group-containing non-fluorine-containing anionic surfactant having a pKa of less than 4 include alkylsulfonates, alkylsulfates, alkyl aryl sulfates, and their salts; aliphatic (carboxylic) acids and their salts; and phosphoric acid alkyl esters, phosphoric acid alkyl aryl esters, and their salts. In particular, a compound selected from the group consisting of sulfonic acids, carboxylic acids, and their salts is preferred, and aliphatic carboxylic acids and their salts are preferred. The aliphatic carboxylic acids and their salts are preferably a saturated or unsaturated C9-C13 aliphatic carboxylic acid in which the terminal H may be replaced by —OH. The aliphatic carboxylic acid is preferably a monocarboxylic acid, and the monocarboxylic acid is preferably a decanoic acid, undecanoic acid, undecenoic acid, lauric acid, or hydrododecanoic acid.

The aqueous fluoropolymer dispersion of the present invention may contain, if necessary, other resins as long as the features of the present invention are not impaired.

Examples of the other resins include, but are not particularly limited to, polyethylene oxide (dispersion stabilizer), polyethylene glycol (dispersion stabilizer), phenol resins, urea resins, epoxy resins, melamine resins, polyester resins, polyether resins, acrylic silicone resins, silicone resins, silicone polyester resins, and polyurethane resins.

The aqueous fluoropolymer dispersion of the present invention may contain an additive used for common aqueous fluoropolymer dispersions for enhancing the coating property and the property of a resulting coating film.

The additive may be selected depending on the intended use of the aqueous dispersion, and examples of the additive include, but are not particularly limited to, leveling agents, solid lubricants, wood flour, quartz sand, carbon black, diamond, tourmaline, germanium, alumina, silicon nitride, fluorite, clay, talc, extender pigments, various bulking agents, conductive fillers, bright materials, pigments, fillers, pigment dispersants, anti-settling agents, water absorbers, surface conditioners, thixotropy imparting agents, viscosity modifiers, anti-gelling agents, ultraviolet absorbers, light stabilizers, plasticizers, anti-flooding agents, anti-skinning agents, anti-scratch agents, mildew proofing agents, anti-microbial agents, antioxidants, antistatic agents, silane coupling agents, defoaming agents, drying agents, and cissing inhibitors.

Examples of the bright materials include mica, metal powder, glass beads, glass bubbles, glass flakes, and glass fibers. The aqueous fluoropolymer dispersion of the present invention containing such a bright material can be formed into a coating film with an excellent outward appearance. The amount of the bright material is preferably 0.1 to 10.0% by mass based on the solids content of the aqueous fluoropolymer dispersion.

Examples of the metal powder include, but are not particularly limited to, powder of an elemental metal such as aluminum, iron, tin, zinc, gold, silver, and copper; and powder of an alloy such as aluminum alloy and stainless steel. The metal powder may be in any form, and may be, for example, in the form of particles or flakes. The aqueous fluoropolymer dispersion of the present invention may be a clear coating material not containing such coloring components.

Examples of the viscosity modifier include methyl cellulose, alumina sol, polyvinyl alcohol, and carboxylated vinyl polymers.

Examples of the defoaming agent include non-polar solvents such as toluene, xylene, and C9-C11 hydrocarbons; and silicone oil.

Examples of the drying agent include cobalt oxide.

The aqueous fluoropolymer dispersion of the present invention may preferably be used as a coating material, and specifically used as a top coating material, an intermediate coating material, or a coating material for lining.

The coating may be performed by various methods similar to conventional coating methods, such as a dipping method, a spray method, a roll coating method, a doctor blade method, a spin flow coating method, and a curtain flow coating method.

The aqueous fluoropolymer dispersion of the present invention may be applied directly to a substrate. In order to improve adhesion, it is desirable that a primer layer be formed and the aqueous fluoropolymer dispersion be applied thereto. Examples of the substrate to be used include, but are not particularly limited to, substrates made of various metals, porcelain enamel, glass, or various ceramics. Further, in order to improve adhesion, a surface of the substrate is preferably made rough, for example, by sandblasting.

The aqueous fluoropolymer dispersion applied to the substrate is then dried. The feature of the aqueous fluoropolymer dispersion of the present invention is that the aqueous fluoropolymer dispersion does not generate mud cracks during the drying step. Drying is performed under usual conditions. Depending on the boiling point of a polyhydric alcohol to be used, dry to touch is achieved by drying preferably at room temperature to 150° C., and more preferably at 80° C. to 150° C. for 5 to 20 minutes.

A dried coating film is fired (processed). The firing (processing) temperature and time may be changed depending on the kind or melting temperature of the fluororesin. For example, the film is fired at the melting temperature or higher of the fluororesin, and is usually fired at 360° C. to 415° C. for 5 to 30 minutes.

A primer layer may be formed in such a way that a primer is applied, dried, and fired, and the aqueous fluoropolymer dispersion of the present invention is then applied thereto, dried, and fired (2-coat 2-bake process); a primer is applied and dried, and the aqueous fluoropolymer dispersion of the present invention is then applied thereto and dried, and both the primer and the aqueous fluoropolymer dispersion are simultaneously fired (2-coat 1-bake process); or a primer is applied and dried, an intermediate coating material containing a bright material, which is the aqueous fluoropolymer dispersion of the present invention, is applied thereto and dried, a top coating material, which is a clear coating material other than the aqueous fluoropolymer dispersion of the present invention, is applied thereto and dried, and both the intermediate coating material and the top coating material are simultaneously fired (3-coat 1-bake process). In addition, after application of a primer, an intermediate coating material containing a bright material and a top coating material as a clear coating material, which are both the aqueous fluoropolymer dispersion of the present invention, may sequentially be applied.

Coated articles listed below can be produced by application of the aqueous fluoropolymer dispersion of the present invention. Examples of the coated articles include cooking equipment such as frying pans, grill pans, pressure cookers, other various pans, rice cookers, rice cake machines, ovens, hotplates, bread molds, knives, and gas cookers; food and beverage containers such as electric pots and ice cube trays; equipment for food industry such as mixing rolls, mill rolls, conveyers, and hoppers; industrial products such as rolls for office automation devices [OA], belts for OA devices, separation pawls for OA devices, paper making rolls, and calender rolls for filmproduction; metal molds and molds for molding foamed polystyrene and the like, dies/release plates for molding such as release plates for producing plyboards and decorative plates; kitchen equipment such as range hoods; frozen food processing equipment such as conveyer belts; tools such as saws, files, dies, and borers; household products such as irons, scissors, and knives; metal foils and electric wires; sliding bearings of food processing machines, packaging machines, and spinning machines; slide members of cameras and watches; auto parts such as pipes, valves, and bearings; and snow shovels, plows, parachutes, ship bottoms, boilers, and industrial containers (particularly for semiconductor industry).

The aqueous fluoropolymer dispersion of the present invention may be used, for example, in impregnation involving impregnating a porous medium such as a nonwoven fabric and a resin molded product in the aqueous fluoropolymer dispersion, drying the medium, and preferably firing the medium; or in cast film formation involving applying the aqueous fluoropolymer dispersion to a substrate such as glass, drying the applied dispersion, immersing the resulting product in water as needed, and removing the substrate to obtain a thin film. For example, the aqueous fluoropolymer dispersion is used as aqueous dispersion coating materials, binders for electrodes, and water repellents for electrodes.

The aqueous fluoropolymer dispersion of the present invention may preferably be used as a processing aid. Use of the aqueous fluoropolymer dispersion of the present invention as a processing aid in combination with a host polymer or the like improves the melt strength at melt processing of the host polymer, and the mechanical strength, electrical characteristics, flame retardancy, anti-dropping property, and sliding property of the resulting polymer.

The aqueous fluoropolymer dispersion of the present invention containing polytetrafluoroethylene as the fluoropolymer (B) is preferably used as a processing aid after combining with a hot melt processable fluororesin. The aqueous fluoropolymer dispersion of the present invention is suitable as materials of PTFEs, which is described, for example, in JP H11-49912 A, JP 2003-24693 A, U.S. Pat. No. 5,804,654, JP H11-29679 A, and JP 2003-2980 A. The aqueous fluoropolymer dispersion of the present invention is as good as the processing aids described in the publications.

The aqueous fluoropolymer dispersion of the present invention containing polytetrafluoroethylene as the fluoropolymer (B) is preferably formed into co-coagulation powder by mixing with an aqueous dispersion of a hot melt processable fluororesin and coagulating the mixture. The co-coagulation powder is suitable as a processing aid. Examples of the hot melt processable fluororesin include tetrafluoroethylene/hexafluoropropylene copolymers (FEP), tetrafluoroethylene/perfluoro(alkyl vinyl ether) copolymers (PFA), ethylene/tetrafluoroethylene copolymers (ETFE), and ethylene/tetrafluoroethylene/hexafluoropropylene copolymers (EFEP). In particular, FEP is preferred.

The aqueous fluoropolymer dispersion of the present invention containing polytetrafluoroethylene as the fluoropolymer (B) is preferably used as a dust-control treatment agent. The dust-control treatment agent may be used as follows: it is mixed with a dust-emitting substance, and the mixture is subjected to compression-shearing action at a temperature of 20° C. to 200° C. to fibrillate polytetrafluoroethylene, thereby emission of dust from the dust-emitting substance is suppressed. For example, the dust-control treatment agent may be used in the methods disclosed, for example, in JP 2827152 B and JP 2538783 B. The dust-control treatment agent is suitably used for dust-control treatment in the fields of building products, soil stabilizers, solidifying materials, fertilizers, landfill of incineration ashes and harmful substances, explosion proof equipment, and cosmetics.

The aqueous fluoropolymer dispersion of the present invention is also suitably used for the dust-control treatment agent composition according to WO 2007/004250, and may also be used in the dust-control treatment according to WO 2007/000812.

The aqueous fluoropolymer dispersion of the present invention containing polytetrafluoroethylene as the fluoropolymer (B) is preferably used as a material of polytetrafluoroethylene fibers obtained by a dispersion spinning method. The dispersion spinning method is a method for providing polytetrafluoroethylene fibers by mixing the aqueous polytetrafluoroethylene dispersion with an aqueous dispersion of a matrix polymer, extruding the mixture to form an intermediate fiber structure, and firing the intermediate fiber structure to decompose the matrix polymer and sinter the polytetrafluoroethylene particles.

EXAMPLES

The present invention is explained in more detail below by way of examples, although the invention is not limited by these examples.

The measurements in examples were performed according to the following methods.
(1) Hydrodynamic Radius A composition including a nonionic surfactant was mixed with water to prepare an aqueous solution having a nonionic surfactant concentration of 0.1 kg/L.

The scattered-light intensity of the aqueous solution at 40° C. was determined by dynamic light scattering measurement using a ALV/SLS/DLS-5000 light scattering apparatus (produced by ALV) equipped with a multiple τ digital correlator. A Nd: YAG laser operating at a wavelength $\lambda_0$ of 532 nm in vacuum was used as a light source. The intensity was measured at a scattering angle from 30° to 105°.

Scattering light intensity autocorrelation function $g^{(2)}(t)$ resulting from the dynamic light scattering measurement was resolved into relaxation spectra given by the following equation by CONTIN analysis.

[Equation 1]

$$\frac{g^{(2)}(t)-1}{g^{(2)}(0)-1} = \sum_{i=1}^{\nu} A(\tau_i)\exp(-l/\tau_i) \quad (1)$$

Here, $\tau_i$ and $A(\tau_i)$ represent i'th relaxation time and i'th relaxation strength, respectively. The range of the relaxation time from 1 μs to 1 s was divided into about 150 equal segments on a logarithmic scale, and CONTIN analysis was performed.

Diffusion coefficient D and hydrodynamic radius $R_H$ were determined from the resulting relaxation spectrum $A(\tau_i)$ using the following equations.

[Equation 2]

$$D = \lim_{k\to 0}\sum_i \tau_i^{-1} A(\tau_i)/2k^2 \sum_i A(\tau_i), \quad (2)$$

$$R_H \equiv \frac{k_B T}{6\pi\eta_0 D}$$

$k_B$ represents a Boltzmann constant, T represents an absolute temperature, $\eta_0$ represents a viscosity coefficient of a solvent, and k represents an absolute value of a scattering vector defined by the equation:

[Equation 3]

$$k = \frac{4\pi\eta_0}{\lambda_0}\sin\frac{\theta}{2} \quad (3)$$

(2) Limiting Viscosity

The flow times of 5%, 6.7%, and 10% aqueous solutions of the target nonionic surfactant were each measured at 25° C. and 40° C. using a Cannon-Fenske viscometer (water flow time: 120 seconds at 25° C.). Since the structure of the nonionic surfactant may change in water depending on its concentration, the flow times in a capillary measured at the concentrations using a Cannon-Fenske viscometer were inserted into the following equations derived from Huggins plot and Mead-Fuoss plot to determine intrinsic viscosities (limiting viscosities [η]). c is a concentration (g/ml) of an aqueous solution, t is a flow time (seconds) of an aqueous solution of each concentration, and $t_0$ is a flow time (seconds) of water.

[Equation 4]

$$[\eta] = \frac{[2(\eta_{sp} - \ln\eta_r)]^{1/2}}{c}$$

$$\eta_r \equiv \frac{\eta}{\eta_0},$$

$$\eta_{sp} \equiv \eta_r - 1$$

$$\eta_r = t/t_0$$

(3) Fluoropolymer Concentration (P)

The fluoropolymer concentration was determined from the equation: P=Z/X×100(%), wherein an ignition residue (Z g) was obtained by drying about 1 g (X g) of a sample in an aluminum cup (diameter: 5 cm) at 100° C. for 1 hour and further drying at 300° C. for 1 hour.

(4) Fluorine-containing Surfactant Concentration

The fluorine-containing surfactant concentration was determined in such a way that methanol in an amount equal to the amount of the resulting aqueous dispersion was added to the aqueous dispersion, soxhlet extraction was performed, and high-performance liquid chromatography [HPLC] was performed under the following conditions. The fluorine-containing surfactant concentration was calculated using a standard curve of a known fluorine-containing surfactant concentration obtained from HPLC measurement using the eluate under the following conditions.

(Measurement Conditions)

Column: ODS-120T (4.6φ×250 mm, produced by TOSOH CORPORATION)

Developer solution: Acetonitrile/0.6% by mass aqueous perchloric acid solution=1/1 (vol/vol %)

Amount of sample: 20 μL

Flow rate: 1.0 ml/min

Detection wavelength: UV 210 nm

Column temperature: 40° C.

(5) Amount (N) of Nonionic Surfactant

The amount of the nonionic surfactant was determined by subtracting the amount of a stabilizer from the amount N that was calculated from the equation: N=[(Y−Z)/X]×100(%), wherein an ignition residue (Y g) was obtained by heating about 1 g (X g) of a sample in an aluminum cup (diameter: 5 cm) at 100° C. for 1 hour, and an ignition residue (Z g) was obtained by heating the resulting ignition residue (Y g) at 300° C. for 1 hour. The amount of the stabilizer was calculated based on the amount added at the time of preparation.

(6) Viscosity

The viscosity at 25° C. or 40° C. was measured using a B-type rotational viscometer (produced by TOKYO KEIKI INC.) in accordance with JIS K 6893.

(7) Mechanical Stability

An aqueous fluoropolymer dispersion (150 ml) maintained at 35° C. was circulated at 1500 ml/min for 60 minutes using a diaphragm pump equipped with a tube made of vinyl chloride having an inner diameter of 8 mm and an outer diameter of 11 mm, and was passed through a 200-mesh SUS screen. The oversize fraction was weighed, and the proportion (% by mass) thereof to the fluoropolymer contained in the aqueous fluoropolymer dispersion used was determined.

(8) Storage Stability

An aqueous fluoropolymer dispersion (500 ml) contained in a plastic container was allowed to stand in a room at a constant temperature of 40° C. for one month. Thereafter, the aqueous fluoropolymer dispersion was gently stirred and allowed to pass through a 400-mesh stainless steel screen, and an aggregated matter left on the screen was dried at 300° C. for 1 hour. The percentage of the amount of the aggregated matter based on the resin solids content (based on the fluoropolymer in the original aqueous fluoropolymer dispersion) was determined. Dispersions with poor storage stability generate a large amount of aggregated matter.

Examples 1 to 3, Comparative Examples 1 to 4

The hydrodynamic radii and limiting viscosities of the surfactants and the surfactant compositions shown in Table 1 were measured. The results are shown in Table 1. The results show that a smaller hydrodynamic radius lowers the limiting viscosity at 40° C.

Production Example 1

A nonionic surfactant ($C_{13}H_{27}$—$(OE)_n$-OH, hydrophobic group is a butene trimer, product name: TDS80, produced by DAI-ICHI KOGYO SEIYAKU CO., LTD.) was added to the PTFE aqueous dispersion 1 obtained in Example 8 of JP 2005-036002 A (average particle size: 274 nm, PTFE concentration: 22%, fluorine-containing anionic surfactant: $CF_3(CF_2)_2O(CF_2)_2COONH_4$, amount of fluorine-containing anionic surfactant: 4280 ppm based on PTFE) so that a dispersion containing the nonionic surfactant in an amount of 10 parts by mass based on 100 parts by mass of the PTFE was prepared. Subsequently, a 20-mm diameter column was filled with 250 ml of an OH-form anion-exchange resin (product name: AMBERJET AMJ4002, produced by Rohm and Haas), and the temperature of the column was adjusted to 40° C. The PTFE aqueous dispersion 1 was allowed to pass through the column at SV=1. Further, a nonionic surfactant was added to the aqueous dispersion after passing through the column to prepare a solution with a nonionic surfactant concentration of 20%. The solution was maintained at 63° C. for 3 hours, and separated into a supernatant phase 1 and a condensed phase 1. The condensed phase 1 was collected as a PTFE aqueous dispersion 2.

The PTFE aqueous dispersion 2 has a fluoropolymer concentration (PC) of 69.3% and a nonionic surfactant concentration (NC) of 2.8 parts by mass based on 100 parts by mass of the PTFE, and contains 1 ppm of a fluorine-containing anionic surfactant based on the PTFE.

Example 4

To the PTFE aqueous dispersion 2 (300 g) obtained in Production Example 1 were added TDS80 (1.7 g), surfactant A (3.7 g), and surfactant B (1.2 g), and further a 5% aqueous solution (2.1 g) of ammonium lauryl sulfate salt and water (37.7 g) so that a PTFE aqueous dispersion having a PC of 60% was prepared. The viscosity, mechanical stability, and storage stability were evaluated. The results are shown in Table 2.

Example 5

To the PTFE aqueous dispersion 2 (300 g) obtained in Production Example 1 were added TDS80 (5.4 g), surfactant C (1.2 g), a 5% aqueous solution (2.1 g) of ammonium lauryl sulfate salt, and water (37.7 g) so that a PTFE aqueous dispersion having a PC of 60% was prepared. The viscosity, mechanical stability, and storage stability were evaluated. The results are shown in Table 2.

Example 6

To the PTFE aqueous dispersion 2 (300 g) obtained in Production Example 1 were added TDS80 (4.2 g), surfactant D (2.5 g), a 5% aqueous solution (2.1 g) of ammonium lauryl sulfate salt, and water (37.7 g) so that a PTFE aqueous dispersion having a PC of 60% was prepared. The viscosity, mechanical stability, and storage stability were evaluated. The results are shown in Table 2.

Comparative Example 5

PTFE dispersion 3 was obtained in the same manner as in Production Example 1 except that TX100 was used instead of the nonionic surfactant.

The PTFE dispersion 3 had a fluoropolymer concentration of 68.9%, a surfactant concentration of 4.2 parts by weight based on 100 parts by weight of the PTFE. The amount of the fluorine-containing anionic surfactant was 1 ppm based on the PTFE.

To the aqueous dispersion (300 g) were added TX100 (3.7 g), a 5% aqueous solution (2.1 g) of ammonium lauryl sulfate salt, and water (38.7 g) so that a PTFE aqueous dispersion having a PC of 60% was prepared. The viscosity, mechanical stability, and storage stability were evaluated. The results are shown in Table 2.

Comparative Example 6

PTFE dispersion 4 was obtained in the same manner as in Production Example 1 except that TD90 was used instead of the nonionic surfactant.

The PTFE dispersion 4 had a fluoropolymer concentration of 67.2%, a surfactant concentration of 3.8 parts by weight based on 100 parts by weight of the PTFE. The amount of the fluorine-containing anionic surfactant was 1 ppm based on the PTFE.

To the aqueous dispersion (300 g) were added TD90 (4.4 g), a 5% aqueous solution (2.0 g) of ammonium lauryl sulfate salt, and water (29.5 g) so that a PTFE aqueous dispersion having a PC of 60% was prepared. The viscosity, mechanical stability, and storage stability were evaluated. The results are shown in Table 2.

Comparative Example 7

To the PTFE aqueous dispersion 2 (300 g) obtained in Production Example 1 were added TDS80 (6.7 g), a 5% aqueous solution (2.1 g) of ammonium lauryl sulfate salt, and water (37.7 g) so that a PTFE aqueous dispersion having a PC of 60% was prepared. The viscosity, mechanical stability, and storage stability were evaluated. The results are shown in Table 2.

The results show that the surfactants of the examples show excellent mechanical stability and storage stability.

TABLE 1

| | Surfactant (molar ratio) | 40° C. hydrodynamic radius (nm) | $[\eta]$ at 25° C. of 10% aqueous solution | $[\eta]$ at 40° C. of 10% aqueous solution |
|---|---|---|---|---|
| Example 1 | TDS80/surfactant A/surfactant B = 58.4/34.8/6.8 | 6.2 | 12.0 | 20.5 |
| Example 2 | TDS80/surfactant C = 92.8/7.2 | 6.8 | 11.6 | 21.8 |
| Example 3 | TDS80/surfactant D = 82.0/18.0 | 6.5 | 11.1 | 19.6 |
| Comparative Example 1 | TX100 | 5.1 | 10.8 | 17.1 |
| Comparative Example 2 | TD90 | 7.5 | 12.5 | 22.4 |
| Comparative Example 3 | TDS80 | 8.4 | 12.8 | 24.0 |
| Comparative Example 4 | TDS80/surfactant A = 88.3/11.7 | 8.4 | 13.6 | 25.6 |

List of surfactants
TDS80: triisobutene ethoxylate (isobutene trimer) produced by DAI-ICHI KOGYO SEIYAKU CO., LTD.
TX100: octylphenol ethoxylate produced by The Dow Chemical Company, cloud point: 66° C.
TD90: tridecyl alcohol ethoxylate produced by Lion Corporation, which contains a hydrophobic group having C11-C14 distribution and gives off a strong odor.
Surfactant A: ethoxylate containing a hydrophobic group having a branched saturated hydrocarbon (C10), cloud point: 56° C.
Surfactant B: 2-heptylundecanol ethoxylate, cloud point of a 1% aqueous solution: 72° C.
Surfactant C: RO—(PO)$_4$—(EO)$_8$—H, wherein PO and EO are added by block addition, R represents a C12, C14, or C16 alkyl group.
Surfactant D: RO—(EO)$_9$—H, wherein R represents a C12-C14 secondary alkyl group.

TABLE 2

| | Surfactant (molar ratio) | Fluoropolymer concentration (%) | Amount of surfactant (%) | pH | Viscosity (cps) 25° C. | Viscosity (cps) 40° C. | Mechanical stability | Storatge stability 40° C. one month |
|---|---|---|---|---|---|---|---|---|
| Example 4 | TDS80/surfactant A/surfactant B = 58.4/34.8/6.8 | 60 | 6 | 9.5 | 29 | 19 | 1.4 | 2.1 |
| Example 5 | TDS80/surfactant C = 92.8/7.2 | 60 | 6 | 9.5 | 27 | 22 | 1.8 | 2.2 |
| Example 6 | TDS80/surfactant D = 82.0/18.0 | 60 | 6 | 9.5 | 25 | 18 | 2.0 | 2.0 |
| Comparative Example 5 | TX100 | 60 | 6 | 9.5 | 21 | 52 | 1.6 | 1.8 |
| Comparative Example 6 | TD90 | 60 | 6 | 9.5 | 25 | 18 | 2.1 | 3.2 |
| Comparative Example 7 | TDS80 | 60 | 6 | 9.5 | 26 | 21 | 2.4 | 3.1 |

List of surfactants
TDS80: triisobutene ethoxylate (isobutene trimer) produced by DAI-ICHI KOGYO SEIYAKU CO., LTD.
TX100: octylphenol ethoxylate produced by The Dow Chemical Company, cloud point: 66° C.
TD90: tridecyl alcohol ethoxylate produced by Lion Corporation, which contains a hydrophobic group having C11-C14 distribution and gives off a strong odor.
Surfactant A: ethoxylate containing a hydrophobic group having a branched saturated hydrocarbon (C10), cloud point: 56° C.
Surfactant B: 2-heptylundecanol ethoxylate, cloud point of a 1% aqueous solution: 72° C.
Surfactant C: RO—(PO)$_4$—(EO)$_8$—H, wherein PO and EO are added by block addition, R represents a C12, C14, or C16 alkyl group.
Surfactant D: RO—(EO)$_9$—H, wherein R represents a C12-C14 secondary alkyl group.

INDUSTRIAL APPLICABILITY

The nonionic surfactant composition of the present invention can be used in an aqueous fluoropolymer dispersion.

REFERENCE SIGNS LIST 1 colloid
2 polymer particle
3 nonionic surfactant
4 aqueous phase

The invention claimed is:

1. A nonionic surfactant composition comprising:
a nonionic surfactant that comprises a molecule having a $C_{10}$-$C_{22}$ alkyl group and/or alkenyl group as a hydrophobic group, a polyoxyalkylene chain as a hydrophilic group, no aromatic ring, no $C_9$-$C_{14}$ alkyl group derived from an alcohol that is produced from a higher olefin derived from a mixture of propylene and butene through an oxo process, and no $C_{13}$ alkyl group derived from an alcohol that is produced from a higher olefin derived from a propylene tetramer through an oxo process,
wherein the nonionic surfactant has a hydrodynamic radius of 5.0 to 8.0 nm at 40° C. in an aqueous solution in which a nonionic surfactant concentration is 0.1 kg/L in the nonionic surfactant composition, the radius being measured by a dynamic light scattering method
wherein the nonionic surfactant comprises a nonionic surfactant represented by the formula (1):

$$R^1O(CH_2CH_2O)_{n1}H$$

wherein $R^1$ is a $C_{13}$ linear or branched alkyl group (except a $C_{13}$ alkyl group derived from an alcohol that is produced from a higher olefin derived from a mixture of propylene and butene through an oxo process, and a $C_{13}$ alkyl group derived from an alcohol that is produced from a higher olefin derived from a propylene tetramer through an oxo process), and $n^1$ is an integer of 5 to 15, and
a nonionic surfactant represented by the formula (2):

$$R^2O(CH_2CH(CH_3)O)_m(CH_2CH_2O)_{n2}H$$

wherein $R^2$ is a $C_{10}$-$C_{16}$ linear or branched alkyl group (except a $C_{10}$-$C_{14}$ alkyl group derived from an alcohol that is produced from a higher olefin derived from a mixture of propylene and butene through an oxo process, and a $C_{13}$ alkyl group derived from an alcohol that is produced from a higher olefin derived from a propylene tetramer through an oxo process), $n^2$ is an integer of 5 to 20, and m is an integer of 1 to 6, and
wherein a molar ratio (1)/(2) of the nonionic surfactant represented by the formula (1) to the nonionic surfactant represented by the formula (2) is (99 to 60)/(1 to 40).

2. An aqueous fluoropolymer dispersion comprising:
a nonionic surfactant composition (A) according to claim 1;
a fluoropolymer (B), and
an aqueous medium (C).

3. A nonionic surfactant composition consisting of a nonionic surfactant and optionally water,
wherein the nonionic surfactant comprises a molecule having a $C_{10}$-$C_{22}$ alkyl group and/or alkenyl group as a hydrophobic group, a polyoxyalkylene chain as a hydrophilic group, no aromatic ring, no $C_9$-$C_{14}$ alkyl group derived from an alcohol that is produced from a higher olefin derived from a mixture of propylene and butene through an oxo process, and no $C_{13}$ alkyl group derived from an alcohol that is produced from a higher olefin derived from a propylene tetramer through an oxo process,
wherein the nonionic surfactant has a hydrodynamic radius of 5.0 to 8.0 nm at 40° C. in an aqueous solution in which a nonionic surfactant concentration is 0.1 kg/L in the nonionic surfactant composition, the radius being measured by a dynamic light scattering method, and
wherein the nonionic surfactant comprises two or more nonionic surfactants including a nonionic surfactant represented by the formula (1):

$$R^1O(CH_2CH_2O)_{n1}H$$

wherein $R^1$ is a $C_{13}$ linear or branched alkyl group (except a $C_{13}$ alkyl group derived from an alcohol that is produced from a higher olefin derived from a mixture of propylene and butene through an oxo process, and a $C_{13}$ alkyl group derived from an alcohol that is produced from a higher olefin derived from a propylene tetramer through an oxo process), and $n^1$ is an integer of 5 to 15, and a nonionic surfactant represented by the formula (3):

$$R^3O(CH_2CH_2O)_{n3}H$$

wherein $R^3$ is a $C_{12}$-$C_{14}$ saturated secondary alkyl group (except a $C_{12}$-$C_{14}$ alkyl group derived from an alcohol that is produced from a higher olefin derived from a mixture of propylene and butene through an oxo process, and a $C_{13}$ alkyl group derived from an alcohol that is produced from a higher olefin derived from a propylene tetramer through an oxo process), and $n^3$ is an integer of 5 to 15.

4. The nonionic surfactant composition according to claim 3,
wherein a molar ratio (1)/(3) of the nonionic surfactant represented by the formula (1) to the nonionic surfactant represented by the formula (3) is (99 to 50)/(1 to 50).

5. A nonionic surfactant composition comprising:
a nonionic surfactant that comprises a molecule having a $C_{10}$-$C_{22}$ alkyl group and/or alkenyl group as a hydrophobic group, a polyoxyalkylene chain as a hydrophilic group, no aromatic ring, no $C_9$-$C_{14}$ alkyl group derived from an alcohol that is produced from a higher olefin derived from a mixture of propylene and butene through an oxo process, and no $C_{13}$ alkyl group derived from an alcohol that is produced from a higher olefin derived from a propylene tetramer through an oxo process,
wherein the nonionic surfactant has a hydrodynamic radius of 5.0 to 8.0 nm at 40° C. in an aqueous solution in which a nonionic surfactant concentration is 0.1 kg/L in the nonionic surfactant composition, the radius being measured by a dynamic light scattering method, and
wherein the nonionic surfactant comprises a nonionic surfactant represented by the formula (1):

$$R^1O(CH_2CH_2O)_{n1}H$$

wherein $R^1$ is a $C_{13}$ linear or branched alkyl group (except a $C_{13}$ alkyl group derived from an alcohol that is produced from a higher olefin derived from a mixture of propylene and butene through an oxo process, and a $C_{13}$ alkyl group derived from an alcohol that is produced from a higher olefin derived from a propylene tetramer through an oxo process), and $n^1$ is an integer of 5 to 15), a nonionic surfactant represented by the formula (4):

$$R^4O(CH_2CH_2O)_{n4}H$$

wherein $R^4$ is a $C_{10}$ branched alkyl group (except a $C_{10}$ alkyl group derived from an alcohol that is produced from a higher olefin derived from a mixture of propylene and butene through an oxo process), and $n^4$ is an integer of 3 to 15, and a nonionic surfactant represented by the formula (5):

$$R^5O(CH_2CH_2O)_{n5}H$$

wherein $R^5$ is a $C_{18}$ branched alkyl group, and $n^5$ is an integer of 5 to 20.

6. The nonionic surfactant composition according to claim 5,
wherein a molar ratio (1)/(4)/(5) of the nonionic surfactant represented by the formula (1), the nonionic surfactant represented by the formula (4), and the nonionic surfactant represented by the formula (5) is (93 to 50)/(45 to 5)/(13 to 2).

* * * * *